(12) United States Patent
Maeda et al.

(10) Patent No.: US 8,689,919 B2
(45) Date of Patent: Apr. 8, 2014

(54) STRUCTURE FOR VEHICLE BODY LOWER PORTION

(75) Inventors: Tomokazu Maeda, Atsugi (JP); Takeshi Onodera, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/811,984

(22) PCT Filed: Jul. 21, 2011

(86) PCT No.: PCT/JP2011/066573
§ 371 (c)(1),
(2), (4) Date: Jan. 24, 2013

(87) PCT Pub. No.: WO2012/014776
PCT Pub. Date: Feb. 2, 2012

(65) Prior Publication Data
US 2013/0118824 A1    May 16, 2013

(30) Foreign Application Priority Data
Jul. 26, 2010  (JP) ................................ 2010-166915

(51) Int. Cl.
*B60R 16/04* (2006.01)
*B60K 1/00* (2006.01)
*B62D 21/02* (2006.01)

(52) U.S. Cl.
USPC ............. 180/68.5; 180/65.1; 180/58; 180/60; 180/311

(58) Field of Classification Search
USPC ............................ 180/65.1, 68.5, 8, 60, 311
See application file for complete search history.

(56) References Cited

U.S. PATENT DOCUMENTS

| | | | | |
|---|---|---|---|---|
| 5,501,289 A | * | 3/1996 | Nishikawa et al. | 180/68.5 |
| 2008/0280195 A1 | * | 11/2008 | Kumar et al. | 429/100 |

FOREIGN PATENT DOCUMENTS

| JP | 05-305879 A | 11/1993 |
|---|---|---|
| JP | 07-081625 A | 3/1995 |
| JP | 07-156831 A | 6/1995 |
| JP | 10-316046 A | 12/1998 |

* cited by examiner

Primary Examiner — Hau Phan
Assistant Examiner — Bryan Evans
(74) Attorney, Agent, or Firm — Foley & Lardner LLP

(57) ABSTRACT

A structure for a vehicle body lower portion according to the present invention includes: a side sill (3) located on each side in a vehicle width direction and extending in a vehicle front-rear direction; a side member (13) joined to a lower face (1*b*) of a floor panel (1) and extending in the vehicle front-rear direction at a position above the side sill (3) and inside the side sill (3) in the vehicle width direction; a brace member (39) connecting a lower part of the side member (13) to an upper side of the side sill (3); and an outer cross member (37) connecting the lower part of the side member (13) to a lower side of the side sill (3).

3 Claims, 3 Drawing Sheets

(a)

(b)

(c)

STRUCTURE FOR VEHICLE BODY LOWER PORTION

TECHNICAL FIELD

The present invention relates to a structure for a lower portion of a vehicle body having a battery mounted below a floor.

BACKGROUND ART

In an electric vehicle such as an electric automobile, a battery serving as a power source for a motor is normally mounted (see Japanese Patent Application Publication No. Hei 5 (1993)-305879, for example). In the electric automobile described in Japanese Patent Application Publication No. Hei 5-305879, side sills, rear pillars, and rear side members respectively located on both right and left sides of a vehicle body are joined together by using four cross members extending in a vehicle width direction, and a battery is housed and placed in a space surrounded by these cross members.

In addition, each end portion in the vehicle width direction of the cross member located on an upper rear side is connected to an intersection of a lower end portion of the corresponding rear pillar and the corresponding side sill by use of a transmission link that extends substantially linearly. Each transmission link extends outward in the vehicle width direction as well as downward toward the front of the vehicle.

Accordingly, when a load is inputted to the vehicle in the direction from the front toward the rear, the transmission links can protect the battery by sustaining a forward movement of the aforementioned cross member.

SUMMARY OF THE INVENTION

However, the above-described conventional vehicle body structure needs to increase plate thickness of the transmission links in order to reliably protect the battery when a load is inputted to the vehicle from a lateral side, and may therefore cause an increase in weight of the vehicle body.

An object of the present invention is to provide a structure for a vehicle body lower portion, which is capable of reliably and efficiently protecting a battery when a load is inputted to the vehicle body from a lateral side while suppressing an increase in weight of a vehicle body.

A structure for a vehicle body lower portion according to the present invention is most mainly characterized in that the structure includes: a side sill located on each side in a vehicle width direction and extending in a vehicle front-rear direction; a side member joined to a lower face of a floor panel and extending in the vehicle front-rear direction at a position above the side sill and inside the side sill in the vehicle width direction; a first connection member connecting a lower part of the side member to an upper side of the side sill; and a second connection member connecting the lower part of the side member to a lower side of the side sill.

According to the present invention, when a load is inputted from a lateral side of a vehicle to a side sill, a side member is turned while maintaining a substantially constant height position. Thus, a structure of the invention can protect a battery reliably and efficiently while suppressing an increase in weight of a vehicle body.

DESCRIPTION OF EMBODIMENTS

An embodiment of the present invention will be described below in detail with reference to the drawings.

Figure 1:
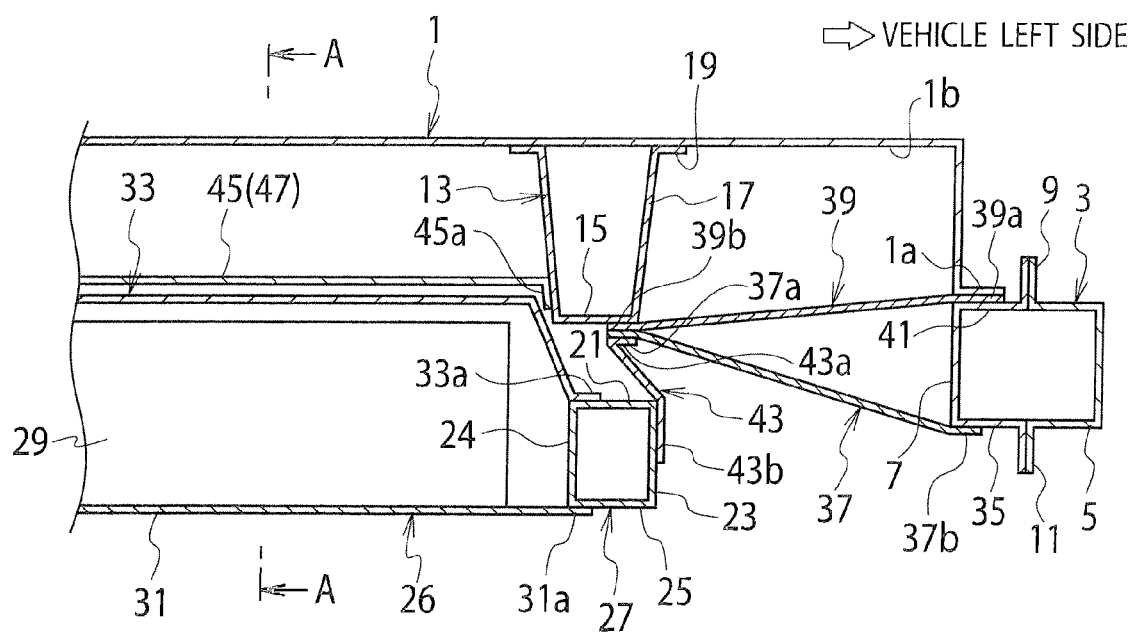
FIG. 1 is a transverse sectional view of a structure for a vehicle body lower portion according to an embodiment of the present invention showing a state cut away in a vehicle width direction and viewed from the front of the vehicle.
Figure 2:
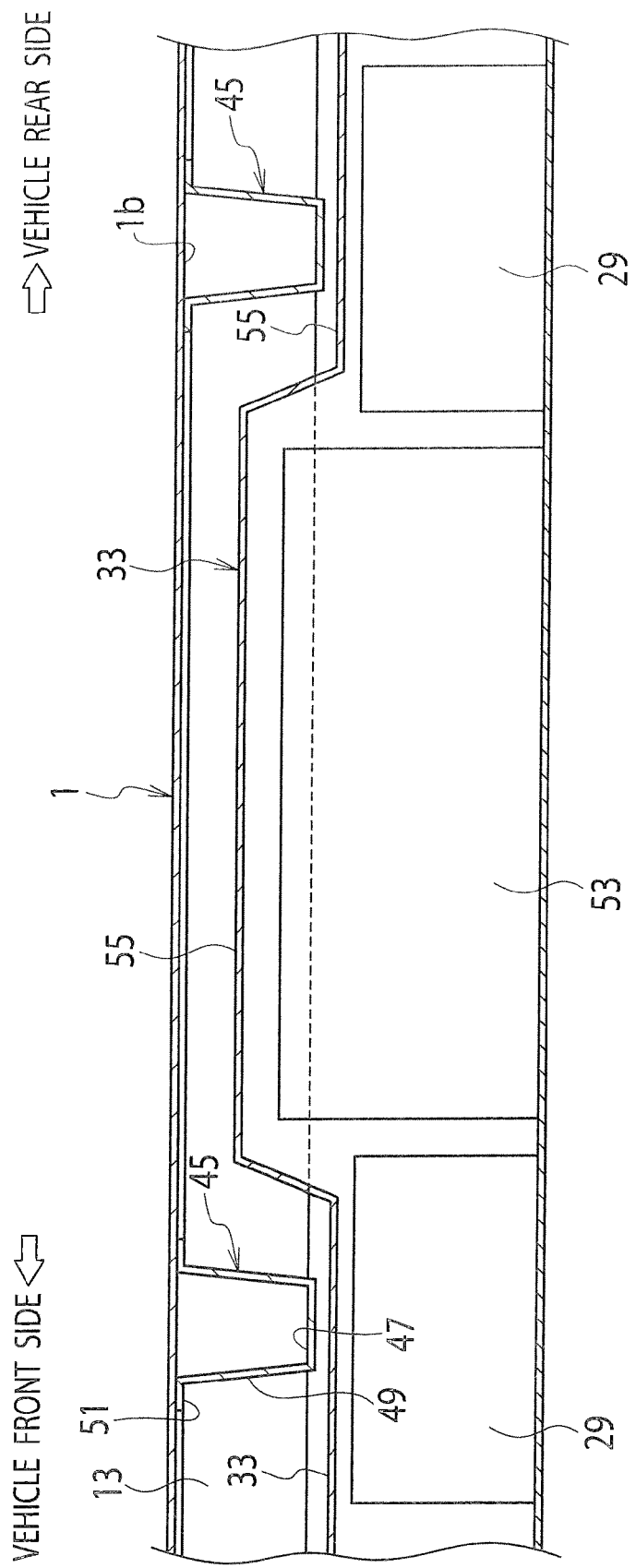
FIG. 2 is a cross-sectional view taken along the A-A line in FIG. 1.
Figure 3:
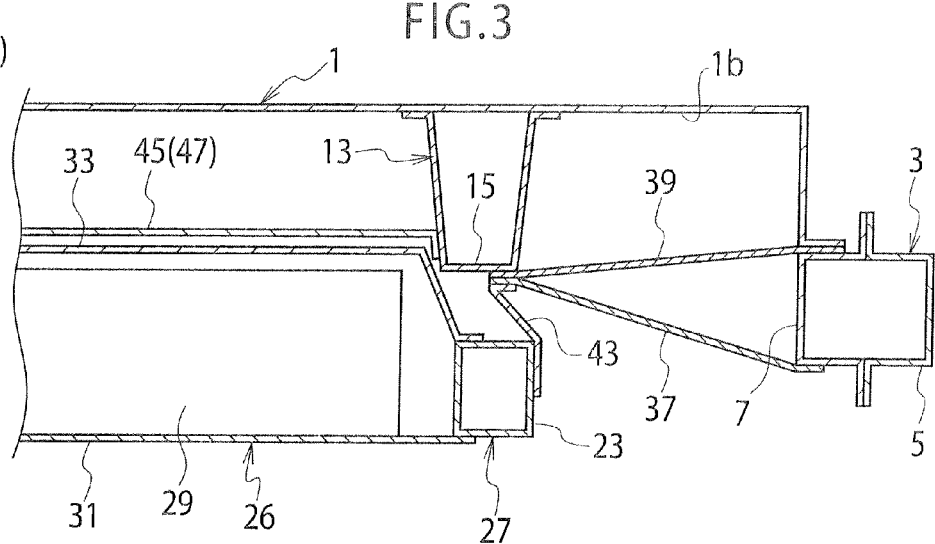
FIG. 3 shows transverse sectional views of the structure for a vehicle body lower portion, in which part (a) is a cross-sectional view corresponding to FIG. 1 and showing a normal state prior to input of a load from a lateral side, part (b) shows an initial stage when a load is inputted from the lateral side to a side sill, and part (c) shows a final stage when the load is inputted from the lateral side to the side sill.
Figure 3:
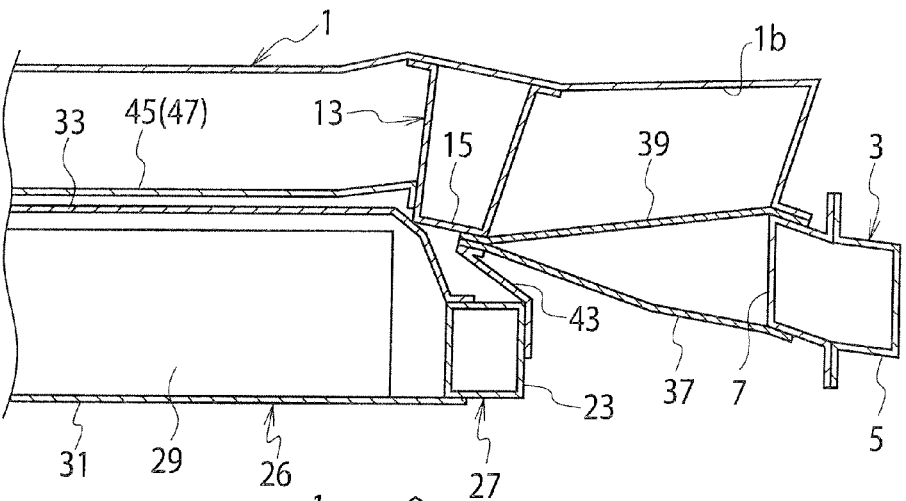
Figure 3:
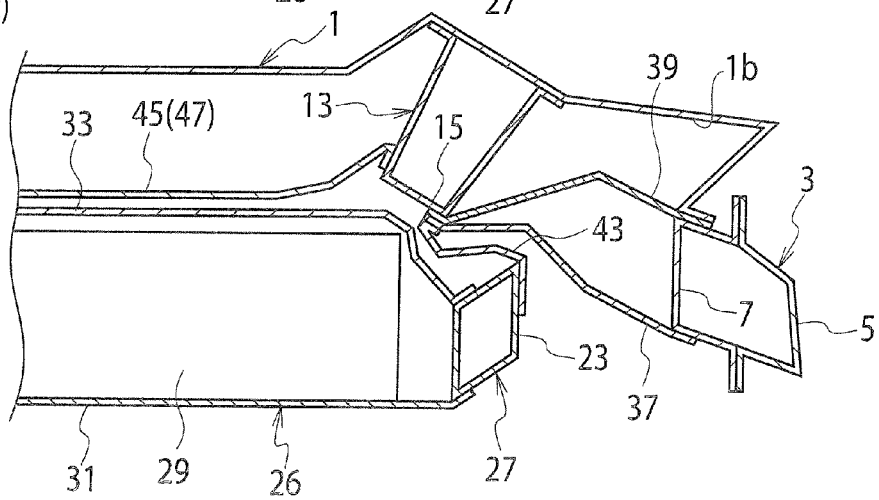

FIG. 1 to FIG. 3 show an example of a structure for a vehicle body lower portion according to an embodiment of the present invention. This embodiment will be described while taking an electric automobile provided with a so-called stilt floor for example. However, the embodiment is also applicable to a so-called hybrid vehicle and the like besides the electric automobile.

As shown in FIG. 1, a floor panel 1 of a vehicle body extends substantially horizontally in a vehicle front-rear direction and in a vehicle width direction. A pair of right and left side sills 3, 3 extending in the vehicle front-rear direction are arranged on both sides in the vehicle width direction of the vehicle. Each side sill 3 is formed of a sill outer part 5 and a sill inner part 7 each having a hat-like cross section. To be more precise, the side sill 3 is formed into a rectangular closed cross-sectional structure by joining upper flanges 9, 9 of the sill outer part 5 and the sill inner part 7 to each other and joining lower flanges 11, 11 of the sill outer part 5 and the sill inner part 7 to each other.

Meanwhile, side members 13 each having a hat-like cross section are located inside and above the side sills 3 in the light of the vehicle width direction in such a manner as to extend in the vehicle front-rear direction below the floor panel 1. Specifically, each side member 13 is integrally formed of a bottom face 15 located on a lower side, side faces 17, 17 bent at two right and left ends of the bottom face 15 and extending upward, and upper end flanges 19 bent at upper ends of the side faces 17 and extending in the vehicle width direction. The side member 13 is formed into a closed cross-sectional structure by joining the upper end flanges 19 to a lower face 1b of the floor panel 1.

Further, battery frames 27 each having a closed cross-sectional structure of a rectangular cross-sectional shape, which is formed of an upper face 21, side faces 23, 24, and a bottom face 25, extend in the vehicle front-rear direction below the side members 13. Here, a battery support member 26 is formed of the battery frames 27, a battery tray 31, and a battery cover 33. The battery tray 31 has end portions 31a in the vehicle width direction joined to the bottom faces 25 of the respective battery frames 27 and is configured to support batteries 29. The battery cover 33 is arranged in such a manner as to cover the batteries 29 from above and has end portions 33a in the vehicle width direction joined to the upper faces 21 of the respective battery frames 27. In this way, the battery support member 26 is located below the side members 13 and supports the batteries 29. Moreover, each of the battery frames 27 is a tubular body formed into the hollow closed cross-sectional structure, which corresponds to an outer peripheral portion of the battery support member 26.

An inner end portion in the vehicle width direction of a lower end face 35 (lower side) of the sill inner part 7 constituting the side sill 3 is connected to an outer end portion in the vehicle width direction of the bottom face 15 (lower part) of the side member 13 by use of an outer cross member 37 which is a second connection member. In this way, each outer cross member 37 being the second connection member connects between the lower part of each side member 13 and the lower side of each side sill 3. Meanwhile, a brace member 39 which is a first connection member is located on an inner side (upper side) of the outer cross member 37. An outer end portion 39a of the brace member 39 is sandwiched between a joining end portion 1a of the floor panel 1 and an upper end face 41 of the sill inner part 7, while an inner end portion 39b thereof is sandwiched between the bottom face 15 of the side member 13 and an inner end portion 37a of the outer cross member 37. In this way, each brace member 39 being the first connection member connects between the lower part of each side member 13 and the upper side of each side sill 3.

Meanwhile, the side face 23 (outer side in the vehicle width direction) located on an outer side in the vehicle width direction of the battery frame 27 is connected to the side member 13 in a vertical direction through a connection bracket 43 which is a third connection member. To be more precise, an upper end flange 43a that extends in the vehicle width direction is formed on an upper end of the connection bracket 43 while a lower end flange 43b is formed on a lower end thereof. The upper end flange 43a is joined to a lower face of the inner end portion 37a of the outer cross member 37, and the lower end flange 43b is joined to the side face 23 on the outer side in the vehicle width direction of the battery frame 27. Meanwhile, an outer end portion 37b of the outer cross member 37 is joined to the lower end face 35 of the side sill 3. In addition, an inner cross member 45 is located above the battery cover 33, of which an end portion 45a on an outer side in the vehicle width direction is bent downward and joined to the side face of the side member 13.

As shown in FIG. 2, the paired inner cross members 45, 45 extending in the vehicle width direction are located on a front side and a rear side below the floor panel 1. Each inner cross member 45 has a hat-like cross section and is integrally formed of a bottom face 47, side faces 49, 49 being bent at two ends of the bottom face 47 and extending upward, and upper end flanges 51 being bent at upper ends of the side faces 49 and extending in the front-rear direction. Note that FIG. 1 is the cross-sectional view taken along the inner cross member 45 located on the front side.

Meanwhile, the batteries 29, 29 described with FIG. 1 are arranged in the front-rear direction below the inner cross members 45, 45. Moreover, another large battery 53 is located between these batteries 29, 29. The height of the large battery 53 is greater than those of the batteries 29. For this reason, the battery cover 33 is formed into such a shape that its central portion 55 in the front-rear direction bulges upward.

Next, description is given of a state of deformation when a load is inputted from a lateral side to the vehicle body lower portion of this embodiment.

When a load is inputted to one of the side sills 3 of the vehicle body lower portion in a normal state shown in FIG. 3(a) from the outside toward the inside in the vehicle width direction, the load is transmitted from the side sill 3 to the bottom face 15 of the side member 13 via the brace member 39 and the outer cross member 37. Meanwhile, since the joining end portion 1a of the floor panel 1 is joined to the upper end face 41 of the sill inner part 7 via the brace member 39, the load is also transmitted to the upper end flange 19 of the side member 13 via the floor panel 1. Here, the portion of the load, which is transmitted from the lower side of the side sill 3 to the lower part of the side member 13 via the brace member 39 and the outer cross member 37, becomes greater than the portion of the load that is transmitted from the upper side of the side sill 3 to the upper part of the side member 13 via the floor panel 1.

Accordingly, as shown in FIGS. 3(b) and 3(c), the side member 13 is turned clockwise when viewed from the front of the vehicle (i.e., in such a manner that the upper part of the side member 13 is directed to the outer side in the vehicle width direction while the lower part thereof is directed to the inner side in the vehicle width direction). Along with this turn, the floor panel 1 and the inner side cross member 45 are deformed. Here, the upper end flange 43a of the connection bracket 43 is joined to the bottom face 15 of the side member 13 via the outer side cross member 37 and the brace member 39, and the lower end flange 43b thereof is joined to the side face 23 of the battery frame 27. Accordingly, an upward movement of the side member 13 is suppressed as compared to the case where the lower end flange 43b is joined to the upper face 21 of the battery frame 27. In other words, the side member 13 is turned while maintaining a substantially constant height position. Thus, an upward movement of the battery frame 27 is suppressed and deformation of the battery tray 31 is also suppressed.

Operation and effects of this embodiment will be described below.

(1) The structure for a vehicle body lower portion of the embodiment includes the side sills 3, the side members 13, the brace members 39 (the first connection members), and the outer cross members 37 (the second connection members). The side sills 3 are located on both sides in the vehicle width direction and extend in the vehicle front-rear direction. The side members 13 are joined to the lower face 1b of the floor panel 1 and extend in the vehicle front-rear direction respectively in positions above the side sills 3 and inside the side sills 3 in the light of the vehicle width direction. The brace members 39 each connect between the lower portion of the corresponding side member 13 and the upper side of the corresponding side sill 3. The outer cross members 37 each connect between the lower part of the corresponding side member 13 and the lower side of the corresponding side sill 3.

Accordingly, if a load is inputted from a lateral side of the vehicle to one of the side sills 3, the load is transmitted from the side sill 3 to the bottom face 15 of the corresponding side member 13 via the brace member 39 and the outer cross member 37. Moreover, the load is also transmitted to the upper end flange 19 of the side member 13 via the floor panel 1. Here, the portion of the load transmitted from the lower side of the side sill 3 to the lower part of the side member 13 via the brace member 39 and the outer cross member 37 becomes greater than the portion of the load transmitted from the upper side of the side sill 3 to the upper part of the side member 13 via the floor panel 1. As a consequence, the side member 13 is turned clockwise when viewed from the front of the vehicle (i.e., in such a manner that the upper part of the side member 13 is directed to the outer side in the vehicle width direction while the lower part thereof is directed to the inner side in the vehicle width direction). Accordingly, the side member 13 is turned while maintaining a substantially constant height position. Thus, the upward movement of the battery frame 27 is suppressed and deformation of the battery tray 31 is also suppressed. As a result, the battery 29 is prevented from coming into contact with the side member 13. In this way, the structure can protect the battery 29 reliably and efficiently when the load is inputted from the lateral side while suppressing an increase in weight of the vehicle body.

(2) The structure for a vehicle body lower portion of the embodiment further includes the battery support member 26 located below the side members 13 and configured to support the batteries 29, and the connection brackets 43 (the third connection members) each connecting the outer side in the vehicle width direction of the corresponding battery frame 27 (the outer peripheral portion) of the battery support member 26 to the corresponding side member 13.

Accordingly, if a load is inputted from a lateral side of the vehicle to the side sill 3, an upward movement of the side member 13 is suppressed as compared to the case where the lower end flange 43b of the connection bracket 43 is joined to the upper face 21 of the battery frame 27. In other words, the side member 13 is turned while maintaining a substantially constant height position. Thus, an upward movement of the battery frame 27 is suppressed and deformation of the battery tray 31 is also suppressed.

(3) In addition, the battery frame 27 is the tubular body formed into the hollow closed cross-sectional structure.

As shown in FIG. 3(c), when the load is inputted from the lateral side of the vehicle, the side face 23 on the outer side in the vehicle width direction of the battery frame 27 moves upward relative to the side face 24 on the inner side in the vehicle width direction and is thereby deformed into a shape having a substantially parallelogram cross section. Here, efficient deformation of the battery frame 27 into the shape having the substantially parallelogram cross section is not inhibited since the battery frame 27 is the tubular body formed into the hollow closed cross-sectional structure.

Various changes of the structure for a vehicle body lower portion of the present invention are possible without departing from the gist of the present invention. For example, the present invention is applicable not only to an electric automobile but also to other vehicles configured to operate with a battery mounted thereon.

INDUSTRIAL APPLICABILITY

According to a structure for a vehicle body lower portion of the present invention, when a load is inputted from a lateral side of a vehicle to a side sill, a side member is turned while maintaining a substantially constant height position. Thus, the structure can protect a battery reliably and efficiently while suppressing an increase in weight of a vehicle body.

The invention claimed is:

1. A structure for a vehicle body lower portion of a vehicle, comprising:
    a side sill located on each side of the vehicle in a vehicle width direction, the side sill including an upper end face and a lower end face and extending in a vehicle front-rear direction;
    a side member joined to a lower face of a floor panel and extending in the vehicle front-rear direction so as to be positioned above the side sill and inside the side sill in the vehicle width direction;
    a first connection member directly connected to a bottom face of the side member and to the upper end face of the side sill; and
    a second connection member connected to the bottom face of the side member and directly connected to the lower end face of the side sill.

2. The structure for a vehicle body lower portion of a vehicle according to claim 1, further comprising:
    a battery support member located below the side member and configured to support a battery; and
    a third connection member connecting the side member to an outer side in the vehicle width direction of an outer peripheral portion of the battery support member.

3. The structure for a vehicle body lower portion of a vehicle according to claim 2, wherein the outer peripheral portion of the battery support member is a tubular body formed into a hollow closed cross-sectional structure.

\* \* \* \* \*